United States Patent [19]

Mazoyer

[11] Patent Number: 4,880,956
[45] Date of Patent: Nov. 14, 1989

[54] DEVICE FOR RADIAL MACHINING AND WELDING ELEMENT

[75] Inventor: Pierre Mazoyer, Chanoz Chatenay, France

[73] Assignee: Orbital Sarl, Meximieux, France

[21] Appl. No.: 100,320

[22] Filed: Sep. 23, 1987

[30] Foreign Application Priority Data

Sep. 24, 1986 [FR] France .............................. 86 13634

[51] Int. Cl.⁴ .............................................. B23K 9/225
[52] U.S. Cl. .................................. 219/60 A; 219/128; 219/161
[58] Field of Search .............. 219/128, 149, 161, 60 A

[56] References Cited

U.S. PATENT DOCUMENTS

2,914,653 11/1959 Ernst .................................... 219/60 A
3,084,246 4/1963 Rieppel et al. ..................... 219/60 A
3,585,345 6/1971 Jespersen ............................. 219/161
3,777,103 12/1973 White et al. ....................... 219/60 A Primary Examiner—Clifford C. Shaw
Attorney, Agent, or Firm—Browdy and Neimark

[57] ABSTRACT

A device for radial machining and welding of a tubular body, said device comprising a tool support which can be placed around the tubular body and including four rollers assuring its guiding in rotation. The support comprises a main body of relatively massive shape which can receive, in its central part, a machining tool or welding tool, and to which are fastened two guide rollers. The guide rollers are placed on both sides of the axis of symmetry of the tool support. Two guide carriages are provided, on each of which guide carriage is mounted a guide roller, and means are provided to modify the position of the guide carriages in relation to the body as a function of the diameter of the tubular body.

17 Claims, 4 Drawing Sheets

DEVICE FOR RADIAL MACHINING AND WELDING ELEMENT

FIELD OF INVENTION

The present field of the invention relates to a device for radial machining and peripheral welding on elements such as tubes, valves, cocks, etc.

BACKGROUND OF THE INVENTION

It is known, especially in the nuclear industry, to use valves, cocks, and clack valves made up of several assembled parts whose outside seal is achieved by means of a peripheral welding, the latter being performed on the projecting lips which are presented by the different parts that make them up.

Consequently, when it is desired, for any reason, for example during malfunctioning, to open a valve provided with such a welding, it is necessary first to eliminate the welding bead, this operation being performed to avoid damaging the valve and particularly its lips to be able to reuse this valve later.

This operation is now still performed by hand with a simple metal-cutting saw. Now, this operation is very delicate and tedious for the operator, because he must work in the joint face of the two lips so as not to damage them and to permit their rewelding. This operation is further performed often under difficult access conditions and most of the time requires several hours.

In French patent No. 2,548 063 a device has already been proposed for cutting the welding of such valves, the device is made up of a support tool in two symmetrical parts delimiting a central opening for the passage of the valve, and provided with grooved rollers to assure the guiding in rotation of this support on the projecting lips of the valve. The cutting tool actually consists of two opposing rotary cutters in the support, between guide rollers, and intended to shear the welding bead. However, this device functions like a pipe-cutter.

Now, because of their dimensions and their assembly, it is inevitable to have a bending of the cutters during their engagement with the metal, so that the cut is never made exactly on the joint face of the lips, which obliges the operator to complete the cut by chance and the metal-cutting saw.

Further, in this known device, the four rollers are all adjustable independently of one another, so that it is difficult to obtain a good concentricity of this device in relation to the valve.

Another cutting device described in the internal journal "Technique en bref" of the Societe EDF functions on the same principle as the device described above, by using two cutting tools working in opposition. In this device the width of the groove of the rollers is greater than the thickness of the lips, so that they rest against the body of the valve and an adjustment in height of the cutting tool is provided to assure a correct positioning of it on the joint face of the lips.

Further, this device is made up of four articulated parts to fit different valve diameters.

Because of these articulations and the multiplicity of adjustments and therefore of play, the device lacks rigidity, which causes breaking of the cutting tools during machining as a result of the bending forces generated on them.

These different devices therefore are not completely satisfactory and, further, do not make it possible to achieve the opening of the valve.

SUMMARY OF THE INVENTION

The object of the present invention is to remedy these drawbacks and to provide a device which makes it possible not only to open easily, quickly and carefully a valve or a tubular body provided with a peripheral welding bead but which also makes it possible to reweld it again and which finally makes it possible to perform different machinings, especially of reshaping the lips, when the valve or the like has been opened and closed several times.

The object of the invention is also to provide a device which can easily be fitted to several diameters of the tubular body, while maintaining sufficient rigidity to permit its use with very fine tools, and which is of a small size and of easy use even in places difficult to access.

This object is attained in the device according to the invention, which comprises a tool support which can be placed around the tubular body that has to be worked and can be driven in rotation around it. This support comprises four rollers assuring its guiding in rotation, in that the support comprises a main body of relatively massive shape, which can receive, in its central part, the cutting or welding tool, and to which are fastened two guide rollers, the latter being placed on both sides of its axis of symmetry. The support comprises two guide carriages on each of which is mounted a guide roller, means being provided to modify the position of the guide carriages in relation to the body as a function of the diameter of the tubular body.

The massive body assures a good holding of the tool and therefore avoids breaking of the latter during machining, and movable guide rollers make possible a fitting of the device to different diameters of the piece to be machined.

Advantageously, each guide carriage is fastened to the body by means of a connecting bar, bars of different length being provided for fitting of the device to different diameters of pieces.

Advantageously also, each of the connecting bars is fastened to the body of the device to form an angle with the axis of symmetry of the latter, which makes it possible to obtain an optimal angular distribution of the rollers according to the different diameters of the pieces.

According to a preferred embodiment, each of the guide rollers exhibits two elastic wings separated by a distance less than the thickness of the lips of the tubular body and can be centered on the joint face of the body, which makes it possible to guarantee an exact positioning of the cutting tool on the joint face of the piece that is to be worked.

According to the invention, systems are also provided for fast adjustment and fine adjustment of the depth of cut, as well as a system for checking of the value of each depth of cut.

Finally, a welding microhead suited to the device according to the invention is also provided.

BRIEF DESCRIPTION OF DRAWINGS

In any case, the machining device according to the invention will be better understood and other characteristics will be brought out with the help of the following description with reference to the accompanying diagrammatic drawing representing, by nonlimiting example, a preferred embodiment of the latter.

DETAILED DESCRIPTION OF THE INVENTION

Figure 1:
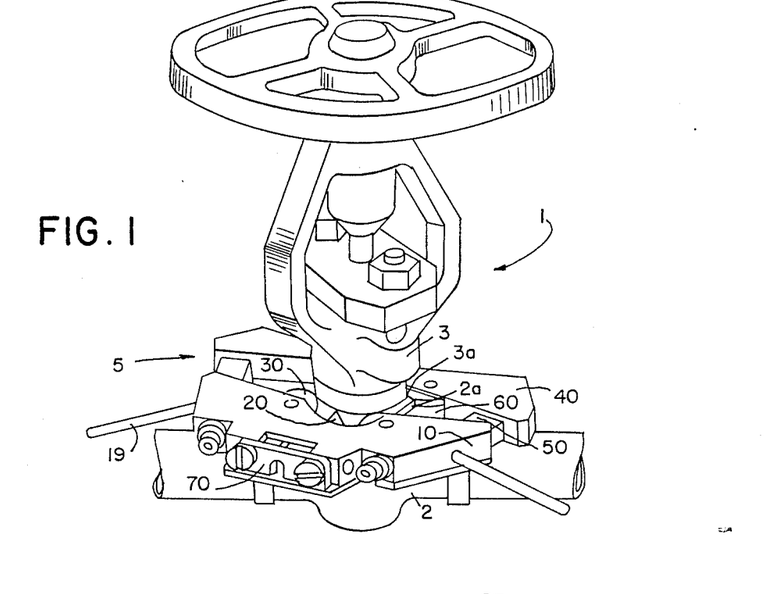
FIG. 1 is a perspective view of this device, mounted on a valve.
Figure 4:
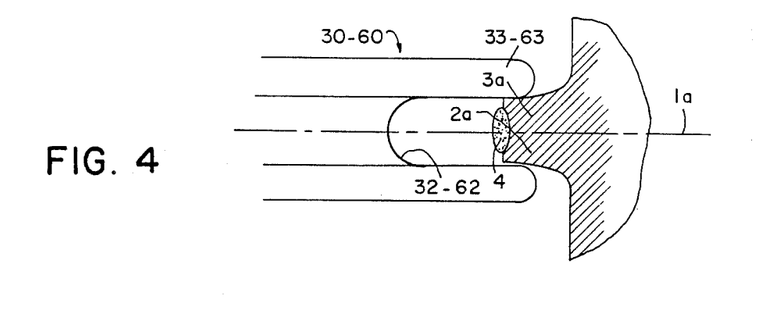
FIG. 4 is, on a large scale, a detailed view of a guide roller.
Figure 5:
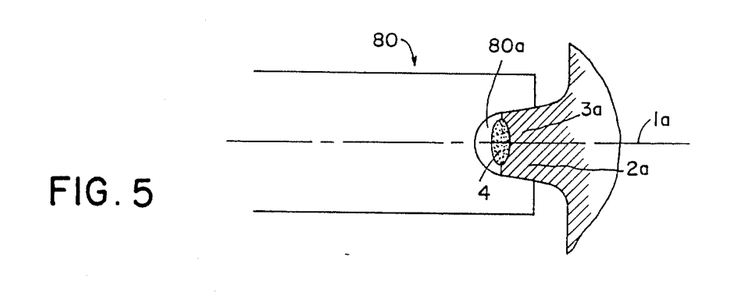
FIGS. 5 to 8 are views similar to FIG. 4, showing different cutting tools which can be used with the device according to the invention.
Figure 6:
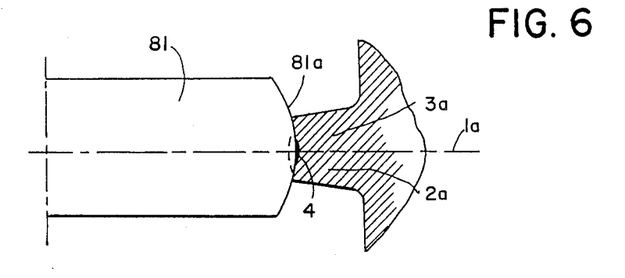
Figure 7:
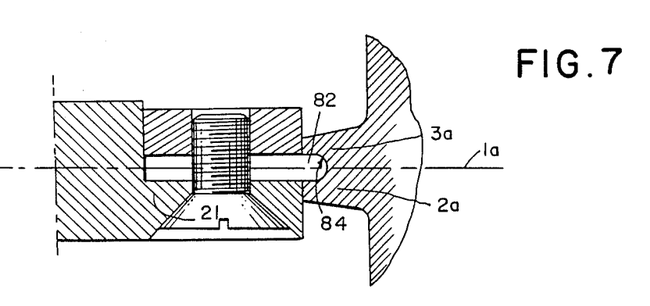

FIG. 1 shows a valve 1 intended to be opened with the device according to the invention, and which is made up of a body 2 and a cap 3, each exhibiting projecting lips 2a, 3a, respectively, and joined to one another at these lips, the seal being made by means of a welding bead 4 made at these lips 2a, 3a (cf. FIGS. 4 and 5).

Machining device 5 according to the invention externally is in the form of a symmetrical body 10, approximately in the form of a half-disk, which carries cutting tool 20 and two guide rollers 30, fastened to this body on both sides of this tool, and two guide carriages 40 assembled to body 10 by means of connecting bars 50—bars 50 of different lengths being provided for fitting of the device to different diameters of tubes—and each provided with a guide roller 60, these carriages 40 and body 10 together delimiting an opening for housing of lips 2a, 3a of the valve that is to be worked.

Figure 2:
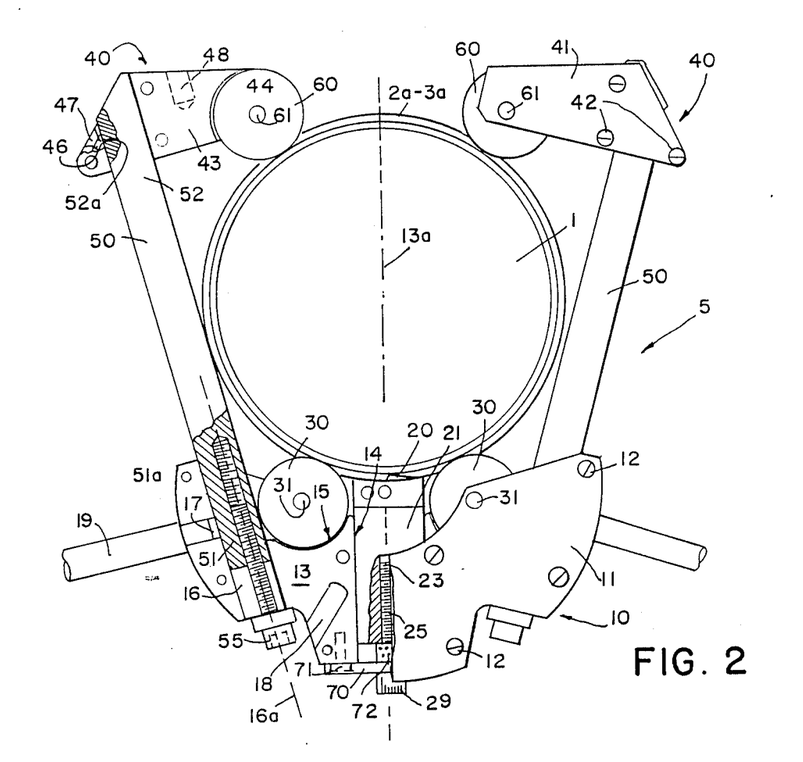
FIG. 2 is a top view of the device of FIG. 1, placed around the lips of a valve, with partial tear-away.
Figure 3:
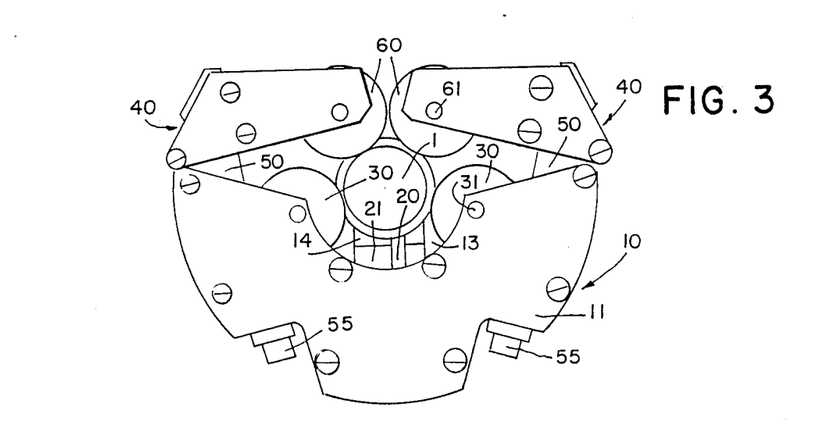
FIG. 3 is a view similar to FIG. 2, showing the device placed around a valve of smaller diameter.

The device 3 according to the invention is represented in greater detail in FIGS. 2 and 3.

Body 10 of this device consists of a base plate 13 and a cover plate 11 having approximately the same dimensions and fastened to the first plate by means of screw 12.

As FIG. 2 particularly shows, various recesses are made in base plate 13 for housing of the different elements: rollers 30, tool 20 and its support 21, and fastening bars 50 of carriages 40, these various recesses being placed symmetrically in relation to axis of symmetry 13a of base plate 13.

First, this base plate 13 exhibits a first rectangular open central recess 14, which is suitable for receiving cutting tool 20 and its support 21.

This plate 13 also exhibits, on both sides of central recess 14, two semicircular recesses 15 for housing of rollers 30, each of the latter being mounted to rotate in associated recess 15 by means of a pin 31 fastened between plates 11 and 13.

Finally, two other elongated recesses 16, also open, are made on the edges of base plate 13 on both sides of axis of symmetry 13a of the latter.

Longitudinal axis 16a of each of these recesses 16 forms an angle of about 15 degrees with axis of symmetry 13a of plate 13, for a purpose that will be explained below.

Each of these recesses 16 is intended to receive an end 51 of connecting bar 50 of one of guide carriages 40.

Various recesses 17, 19 (four in the example of the drawing), extending almost radially in relation to the device, are also made in base plate 13 for placing of handles 19 for driving the device in rotation (cf. FIG. 2).

Of the latter, two, 17, of the recesses are provided with clip type locking means, of handles 19 making possible the locking of the latter and their release by positive action on the clip.

Guide carriages 40 which carry rollers 60 are also each formed by a base plate 43 and a cover plate 41 fastened to the former by means of screw 42.

Like base plate 13 of body 10, each base plate 43 exhibits a recess 44 as a circle portion for housing of associated roller 60, the latter being mounted to rotate on a pin 61 fastened between the two plates 41, 43, as well as a recess 45, elongated and open, for housing of other end 52 of associated fastening bar 50.

On the edge of each base plate 43 is also provided a tapped hole 46 coming out into recess 45 of the latter to make possible the attachment to base plate 43 by means of a screw 47 of the other end 52 of associated connecting bar 50, the latter exhibiting on its edge a notch 52a provided for this purpose; each connecting bar 50 further exhibits at its end 51 a tapped hole 51a for screwing of a screw 55, assuring its connection to body 10.

Finally, a blind recess 48 is provided in each of base plates 43 for housing of a drive handle 19.

Mounting of this device and its placement around lips 2a, 3a of a tubular body are performed as follows:

Plates 11 and 13 of body 10 being assembled, guide carriages 40 are fastened to the latter by means of fastening bars 50 whose length is selected as a function of the diameter of tubular body 1 that is to be worked.

For assembly of each guide carriage 40, each associated bar 50 is slid into recess 45 of the latter and is fastened to it by means of screw 47. It then suffices to slide the other end 51 of the bar into associated recess 16 of body 10 and to make it secure with the latter by means of screw 55 screwed into tapped hole 51a.

When the two carriages 40 are fastened to body 10 of the device and placed around lips 2a, 3a of the tubular body, the clamping pressure of rollers 30, 40 on this body can be adjusted by means of screws 55.

As FIG. 2 shows more particularly, connecting bars 50 rest on large surfaces, both on the base plate 13 of body 10 and on base plates 43 of carriages 40, so that the device exhibits a particularly rigid structure barely sensitive to the bending forces during cutting, which permits its use with very small tools and, consequently, to obtain a good machining precision.

It will be noted that the inclination of connecting bars 50 in relation to axis of symmetry 13a of the body of the device makes it possible to obtain, during fitting of the device to different valve diameters, an optimal angular distribution of guide rollers 30, 60 on the periphery of the valve in relation to devices known so far and particularly in relation to the one described in the journal "Technique en bref" and in which the movement of the rollers is always performed parallel to the axis of symmetry of the device.

In this invention, on the other hand, the inclination of connecting bars 50 causes a different spacing of two rollers 60 in relation to the axis of symmetry. Thus, in the case of FIG. 3, which is the one corresponding to a minimum valve diameter, the two rollers 60 are closer one another than stationary rollers 30, while in the case of FIG. 2, which is the one corresponding to a maximum valve diameter, the two rollers 60 are farther from one another than rollers 30, which makes it possible to obtain a better angular distribution of the forces than if the spacing of rollers 60 were equal to that of rollers 30.

In the present case, the angle which the axis of each bar 50 makes with axis of symmetry 13a of the device was selected to be equal to 15 degrees, which makes it possible to achieve a good compromise between a minimum bulk of the device and the values of minimum and maximum diameters of valves that can be machined with the aid of the latter. Of course, this angle can be modified as a function of the ratios of minimum and maximum diameters of valves that are to be machined.

When the device has been placed around the valve, machining tool 20, mounted on its support 21, is placed in the housing provided for this purpose and consisting of recesses 14 of plate 13, and is locked inside the latter by means of a latch 70 fastened by two screws 71 to body 10, this latch being able to pivot 180 around one of screws 71. In its central part, this latch comprises a pin 73 projecting radially along axis 13a (cf. FIG. 9) and whose role will be explained below.

A screw 25, screwed into a tapped hole 23 of the tool support and going into a notch 72 of the latch, makes it possible to adjust the depth of cut of the tool, i.e., the value of its penetration in relation to the valve. During its closing, latch 70 comes to close behind the other screw 71 and acts as support to screw 25 in reaction to the cutting or crimping force.

Figure 9:
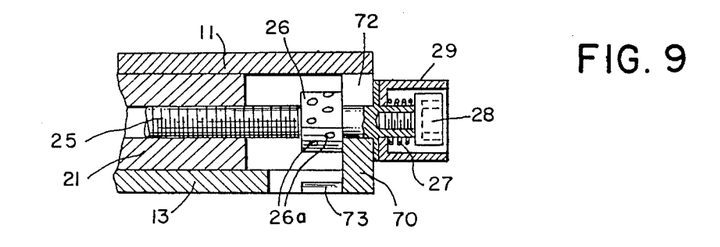
FIG. 9 is, on an enlarged scale, a detailed view in longitudinal section of the system for adjustment of the depth of cut.

This screw 25 is shown in greater detail in FIG. 9. It comprises, close to its end and inside of body 10 in relation to latch 70, a first crown 26 provided with a twelve holes 26a uniformly distributed on its periphery and used, with the aid of a suitable tool, to make screw 25 turn a twelfth of a turn each time by striking the maneuvering tool against pin 73 of the latch, which makes possible a fine, step-by-step adjustment of the depth of cut.

At the end of screw 25, located on the outside of body 10 in relation to the latch, is mounted a vernier 29, which is made integral with this screw in a "disengageable" way by means of a hexagonal screw 28, which is fastened coaxially in this screw 25 by screwing and gluing, and a spring 27 inserted between this vernier 29 and the head of screw 28. This spring 27 assures that vernier 29 and screw 25 are integral with one another during rotation of the screw, while permitting the independent rotation of the vernier in relation to screw 25 for zero adjustment, this adjustment being achieved by a radial mark (not shown in the drawing) carried at the center of the upper part of latch 70 and merged with axis 13a of body 10.

Screw 28 makes possible a fast, approximate adjustment of the depth of cut. Also, latch 70, by its opening and closing by a simple swinging, makes it possible to mount and dismount tool support 22.

As FIG. 4 shows, each of rollers 30, 60 exhibits a relatively deep groove 32, 62, respectively, determining two elastic wings 33, 63. This groove 32, 62 further exhibits a width less than the average thickness of the two lips 2a, 3a of the valve, which makes it possible to obtain the following two advantages:

on the one hand, each roller 30, 60 is placed on lips 2a, 3a with elastic deformation of its wings 33, 63 and therefore is perfectly centered on joint face 1a of valve 1, which makes it possible to guarantee a positioning of the cutting tool exactly on the joint face;

on the other hand, wings 33, 63 of rollers 30, 60 are more flexible and leave fewer marks on lips 2a, 3a.

The different machining tools can be mounted on the device according to the invention to perform different operations, the latter being shown in FIGS. 5 to 8.

First, lips 2a, 3a can have been deformed during a previous welding operation; then a reshaping tool 80 will be used, exhibiting in cross section a profile 80a complementary to that of lips 2a, 3a, as FIG. 5 shows.

Then, existing welding can project well beyond lips 2a, 3a (cf. FIGS. 5 and 6), so that it is necessary to level it to prepare a good surface condition and a controlled geometry for the following machining operation. This leveling operation will then be performed with a tool 81 having a rounded, convex cutting part 81a.

The sectioning itself of welding bead 4 will be performed with a grooved tool 82 (cf. FIG. 7) to achieve not only the sectioning of the previous welding bear 4 but also a groove 84 suitable for receiving the filler wire 83 intended for welding. To reduce to a minimum the removal of material from lips 2a, 3a, cutting tool 82 will be selected to achieve a groove 84 with a rounded bottom and whose dimensions correspond to the diameter of filler wire 83, for example, 1.2 millimeter, in the case of welding by the TIG [tungsten inert gas] process usually used on such valves.

Therefore it can be seen that the device according to the invention makes it possible to use very fine cutting tools (going from 1.2 mm. to 0.5 mm.) and, consequently, to preserve the integrity of the valve to the maximum, which was not possible with the devices known so far.

According to another characteristic of the invention, it is also provided to crimp welding filler wire 83 in groove 84 made in lips 2a, 3a prior to the welding operation.

Figure 8:
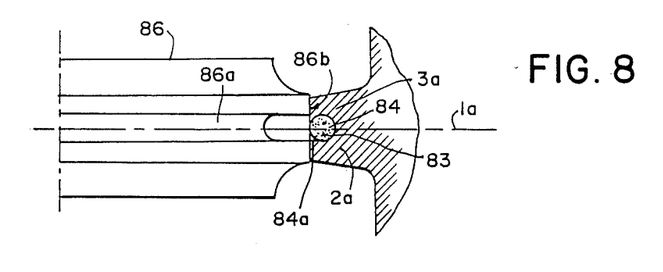

The crimping is made with a crimping tool 86 mounted to rotate on its support and provided with a peripheral groove 86a able to receive filler wire 83. On the one hand, this tool 86 causes placing of filler wire 83 in groove 84 and, on the other hand, crimping of this wire in the groove by bending of edges 84a of the latter onto wire 83 by means of its edges 86b.

This crimping of the filler wire before the welding operation is particularly advantageous, because it makes it possible, even in the case of manual welding, to free the welder from the obligation of holding the filler rod, thus giving him greater work "comfort" and therefore the possibility of better quality work. Further, this process guarantees a constant, minimum volume of filler metal so as to avoid a projecting bulky bead.

Of course, the various machining operations described above being performed with production of chips, a chip collecting device (not shown in the drawing) is provided consisting, for example, of a brush of enveloping shape placed on tool support 21 which avoid sticking of these chips under rollers 30, 60 and under the cutting tool, thus preventing damaging of the running surface and consequently of stray movements at the cutting tool which risk damaging it.

The device according to the invention can also be used for welding of the valve, the welding generally being performed according to the TIG process, by fitting a suitable welding head on the valve.

According to the invention, however, a welding microhead 90 suitable for introduction into housing 14 of the tool-holder and allowing an orientation of hose 91 bringing in the welding current and protective gas.

This welding head 90 is represented more particularly in FIGS. 10 to 13.

Figure 10:
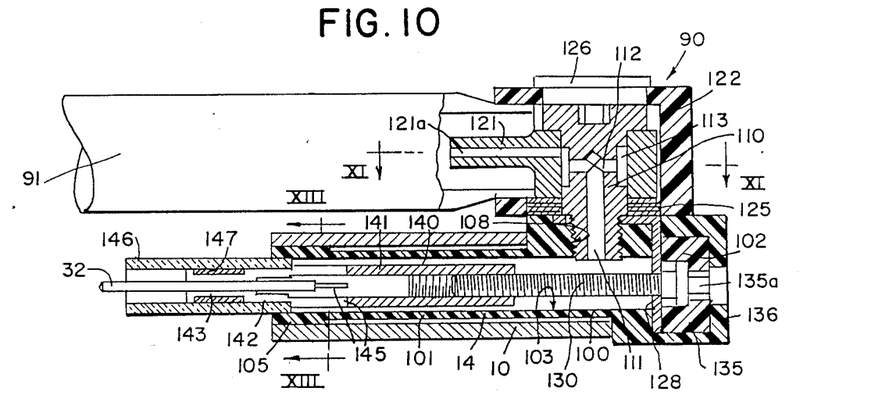
FIG. 10 is, on an enlarged scale, a view in section of the welding head mounted in the body of the device.

As FIG. 10 in particular shows, welding head 90 consists essentially of a body 100 suitable for receiving welding electrode 92 and for bringing to it the electric and gas current by means of a revolving tip 110.

Body 100, which is of a synthetic material, such as, for example, that known under the tradename "Nylon" or "Torlon," has, at its front part 101, a parallelepipedic shape, and exhibits, at its back part, a parallelepipedic head 102 projecting in relation to the rest of the body.

This body 100 therefore is intended to be introduced into housing 14, provided for this purpose in body 10 of the device, by its parallelepipedic part 101, its part 102 projecting in relation to the device.

An open hole 103 is made in this body 100 for placing electrode 92 and its adjustment system.

At its front end, body 100 exhibits a projection 103 by means of which its rests against the walls of recess 14.

Two screws 106, 107, acting on part 101 of the body, are provided to adjustment of the body "in height," to allow an exact positioning of electrode 92 on the joint face of lips 2a, 3a; screw 106 is housed in a tapped hole going through this body 100 and can be acted on through a hole 14a made in base plate 13 of body 10.

This screw 106 rests against plate 11 of body 10 of the device and therefore makes it possible to cause the electrode "to swing" downward in relation to support 105 of body 100 in recess 14.

Screw 107 is, on the contrary, is housed in a tapped hole going through base plate 13 and rests against body 100, which makes it possible to swing the electrode in the opposite direction.

Finally, body 100 exhibits in its head 102 a tapped hole 108 coming out into hole 103.

In this tapped hole 103 is screwed a metal half dog point screw 110 serving at the same time as an axis of rotation and of fastening for a revolving joint 120.

This screw 110 exhibits on its lower part an axial blind hole 111 and, in its middle part, two radial through-holes 112 placed 90 degrees in relation to one another and intersecting blind hole 111.

This screw 110 also exhibits a peripheral recess 113 at the level of holes 112.

Revolving joint 120 is formed by a metal tip 121 which can be connected to the electric part (not shown in the drawing) of hose 91 for bringing in of the electric and gas current of the welding head, and a cylindrical joint of synthetic material 122 inside of which is fitted tip 121.

The unit is fastened to body 100 by means of screw 110 as explained above, with insertion of a bearing 125 of a material such as that known under the tradename "Teflon" and a metal bracket 128.

Bearing 125, on the one hand, assures the gas sealing of revolving joint and, on the other hand, a slightly hard rotation of the latter by the action of a spring.

Bracket 128 assures the passage of the welding current from screw 110 to the back of body 100. A plug of synthetic material 126 is also placed on joint 122 to complete the seal and electric insulation of the unit.

Figure 11:
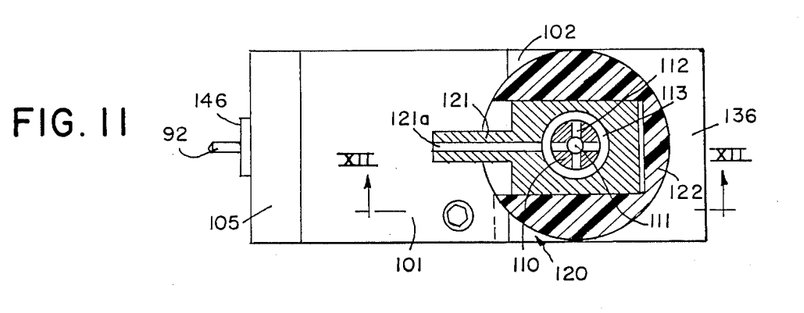
FIG. 11 is a view in section along XI-XI of FIG. 10, the body of the device having been removed.
Figure 12:
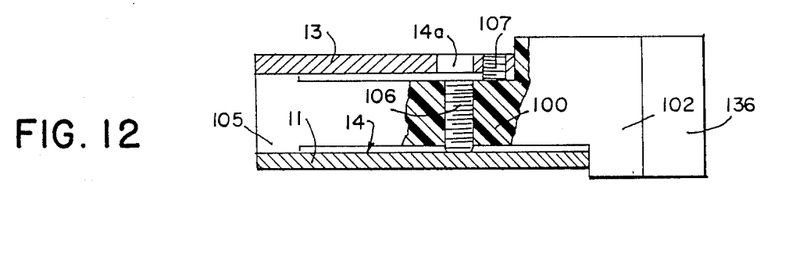
FIG. 12 is a view in section along XII-XII of FIG. 11.
Figure 13:
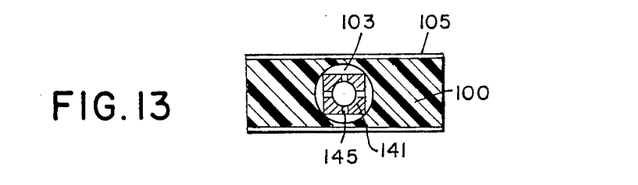
FIG. 13 is a view in section along XIII-XIII of FIG. 10.

As FIGS. 10 and 11 particularly show, tip 121 is provided with a hole 121a communicating with radial holes 112 of screw 110 to allow the intake of gas from this tip to the inside of hole 103 of body 100 via hole 111 of this screw 110.

Electrode 92 is mounted in a tubular metallic electrode-holder 140. This electrode-holder 140 exhibits a part 141 of square section and two parts 142, 143 of circular section, the diameter of part 143 being smaller than that of part 142.

This electrode-holder 140 is driven by force by its part 141 into cylindrical hole 103 of body 100 of the welding head, the sharp corners of this part of square section going into the softer material of body 100 and assuring a locking in rotation of electrode-holder 140, while allowing an axial movement of the latter inside of body 100.

Electrode-holder 140 interiorly exhibits an axial hole exhibiting a diameter different in each of parts 141, 142, 143, this diameter continuing to decrease from part 141 to part 143. The inside diameter of part 143 is less than the diameter of electrode 92.

This electric-holder 140 is also provided with four longitudinal slots 145 made at 90 from one another and extending over parts 143, 142 and over a portion of part 141.

In part 143 of the electrode-holder these slots 145 delimit jaws able to grip electrode 92, the latter being introduced into part 143 by separating the jaws of part 143, and being kept in place by the elasticity of these jaws.

It will be noted that the electrode is locked only in part 143 of electrode-holder 140, since the inside diameter of the latter is greater than that of the electrode in its parts 141 and 142.

In part 141 of the electrode-holder, slots 145 also allow the passage of welding gas from hole 103 of body 100, to the outside, around electrode 92, by passage in four spaces delimited between the outside surface of part 141 of the electrode-holder and the inside wall of hole 103 of body 100.

A tube 146 of a refractory material such as that known under the tradename "Pyrex" is force-fitted onto part 142 of the electrode-holder by means of a bearing 147 such as of PTFE or asbestos itself force-fitted onto part 143 of electrode-holder 142. This tube 146 surrounds electrode 92 so that the gas current flows perfectly around the latter and therefore so as to assure a gaseous protection of the electrode.

Further, this tube 146 is mounted to slide in hole 103 of body 100.

A screw 130 makes it possible to assure adjustment of the electrode unit, i.e., its positioning in relation to the object that is to be welded.

This screw 130 goes through metal bracket 128 and is axially locked in body 100 by means of a knurled adjustment nut 135 of synthetic material covering the head of this screw 130 and applied against body 100 by a fastening flange 136 screwed onto the latter, knurled nut 135 can still turn inside of flange 136 and being provided with a hexagonal hole 135a for driving in rotation by means of a key.

By rotation of knurled nut 135 and, consequently, of screw 130, an axial movement of electrode-holder 140 is caused, which is locked in rotation and, consequently, the adjustment of electrode 12 itself is produced.

It will be noted that, in the electrode-holder described above, an excellent insulation is obtained, because all the elements are of synthetic material, except tip 121, screw 110, bracket 128, screw 130 and electrode-holder 140, which assure a perfect conduction of the current from feed hose 91 to electrode 92 itself, while being perfectly insulated from the outside.

Further, since the welding head is placed in housing 14 of the machining device, electrode 92 is perfectly perpendicular to the part that is to be welded, since it is placed radially in relation to the latter, which makes it possible to obtain a maximum concentration of heat during welding.

Because the device according to the invention is perfectly concentric to the piece to be welded, it is certain that the distance of electrode 92 from the latter will be constant all along the rotation of the unit around the latter.

The fact that hose 91, which brings in the welding current and protective gas, can be oriented in any direction, makes it possible to perform the welding operation itself in any environment.

Thanks to this welding head and to the fact that the filler metal is crimped in the valve, the operator has to check only one parameter, namely, the rate of advance, during the welding operation. He can even perform this operation "blind," which at times is imposed on him because of the space in which he must operate.

Now, in case of manual welding, the operator must:
start his arc by using a flashlight whose brightness he "sees" through his welding goggles and in a very weak light environment;
grasp his welding filler rod (of course, under the same lighting conditions as for the preceding operation), after starting under slight intensity, so as not to damage the joint to be welded;
then, put his hand on the remote-control rheostat to adjust the correct welding intensity;
and, finally, find a support position which enables him to weld at uniformly as possible.

The total operation is enormously simplified and facilitated by the device and welding head according to the invention, since the relative position of the electrode having been previously adjusted by using the capabilities of the equipment, as described above, the operator has to adjust only his welding intensity and press the contact which controls the arrival of the welding current then move the device at a suitable speed, all other adjustments being able to be made with the naked eye, the operator lowering his mask only at the last moment. According to another arrangement of the invention, not shown in the drawing, the control of the welding torch can be mounted on a clip that can be positioned at will on body 10 of the device which also facilitates use of the welding torch.

Of course, this invention is not limited to the single embodiment shown above, by way of nonlimiting example; on the contrary, it takes in all variants using similar or equivalent means.

What is claimed is:

1. A device for radial machining a tubular body comprising:
   a tool support adapted and configured to be placed around said tubular body;
   said tool support driven in rotation around said tubular body;
   said support comprising four rollers;
   said support comprising a main body having an axis of symmetry and a central part;
   an opening in the central part thereof for receiving a tool;
   two guide rollers fastened to said main body, each guide roller being placed on one side of the axis of symmetry;
   two guide carriages;
   a guide roller mounted on each guide carriage;
   means for modifying the position of said guide carriages in relation to said main body as a function of the diameter of said tubular body;
   wherein each of said guide rollers is provided with a groove, each groove determining two elastic wings;
   each guide roller adapted and configured to be placed onto lips on said tubular body with elastic deformation of said wings, and to be centered on a joint face of said tubular body.

2. The device of claim 1 wherein a connecting bar fastens each guide carriage to said body; and
   bars of different length are provided for fitting said device to tublar bodies of differing diameters.

3. The device of claim 2 wherein each connecting rod is fastened to said body to form an angle with said axis of symmetry.

4. The device of claim 3 wherein the angle of each of said connecting bars with said axis of symmetry is from about 10 degrees to about 20 degrees.

5. The device of claim 2 wherein said main body comprises a base plate and a cover plate;
   said base plate provided with a plurality of recesses;
   elements of said support being housed in said recesses;
   said recesses configured to insure a plane-on-plane support of the elements.

6. The device of claim 1 wherein screws are provided, which screws exert a traction force on the ends of the connecting rods on the ends of the connecting bars opposite the guide rollers.

7. The device of claim 1 wherein each of said guide rollers is provided with a groove, each groove determining two elastic wings;
   each guide roller adapted and configured to be placed onto lips on said tubular body with elastic deformation of said wings, and to be centered on a joint face of said tubular body.

8. The device of claim 1 further comprising a crimping tool, said crimping tool mounted opposite said tubular body from said tool support and said crimping tool mounted to rotate on a support and provided with a peripheral groove adapted and configured to receive a filler wire and edges;
   said tool being adapted and configured to place filler wire in a groove made in a joint face of said tubular body, and said tool provided with means to crimp said wire in said groove by bending edges of said groove onto said wire by means of edges of a groove on said tool.

9. The device of claim 1 wherein means are provided to permit fast and fine adjustment of the amount of machining effected by said device on said tubular body.

10. The device of claim 9 further including a welding head having a body having a first end and a second end, and an electrode, and means for axial and height adjustment of said electrode.

11. The device of claim 10 wherein said body of said welding head rests against a recess in said support and means are provided for adjusting the height of said welding electrode in two directions.

12. The device of claim 10 wherein a revolving joint is provided to connect said welding head to a supply hose.

13. The device of claim 12 wherein protective gas of the revolving joint is brought to said electrode through a space delimited between an outside surface of said square section of said electrode holder and the inside wall of the hole of said body.

14. The device of claim 13 wherein said revolving joint comprises a joint made of synthetic material and a metal tip connected to said supply hose of said welding head and fitted into said revolving joint;

said metal tip and said joint being fastened to said body of said welding head by means of a metal screw;

said metal screw being provided with an axial hole and radial holes for passage of gas current from said supply hose through said body.

15. The device of claim 12 wherein said electrode holder can be moved axially in relation to the body of said welding head by means of a screw locked in translation and screwing into said electrode holder.

16. The device of claim 10 wherein said electrode is mounted in a tubular electrode holder;

said electrode holder has a square cross section for mounting in a cylindrical hole in the body of said welding head.

17. The device of claim 16 wherein a metal bracket contacts said screw and an electrode holder.

* * * * *